United States Patent [19]

Boughton

[11] Patent Number: 4,537,540

[45] Date of Patent: Aug. 27, 1985

[54] TRANSPORT FRAMES FOR VEHICLES

[75] Inventor: Thomas T. Boughton, Amersham, England

[73] Assignee: T. T. Boughton & Sons, Ltd., England

[21] Appl. No.: 450,241

[22] Filed: Dec. 16, 1982

[30] Foreign Application Priority Data

Dec. 23, 1981 [GB] United Kingdom ............... 8138707

[51] Int. Cl.$^3$ .................. B63B 25/00; B60P 1/64; B61D 45/00; B65D 19/10
[52] U.S. Cl. ........................................ 410/82; 410/91; 108/55.1; 108/56.1; 403/254; 403/348; 403/353
[58] Field of Search ............... 108/53.1, 55.1, 55.3, 108/56.1; 220/1.5; 248/346, 678; 403/254, 255, 348, 349, 353; 410/77, 82, 84, 90, 91; 414/498

[56] References Cited

U.S. PATENT DOCUMENTS

| | | | |
|---|---|---|---|
| 2,070,613 | 2/1937 | Norbom | 410/91 |
| 3,082,985 | 3/1963 | Herdman | 403/348 X |
| 3,386,600 | 6/1968 | Betjemann | 220/1.5 X |
| 3,404,444 | 10/1968 | Isbrandtsen | 410/82 X |
| 3,438,671 | 4/1969 | Seng | 410/82 |
| 3,459,326 | 8/1969 | Betjemmann | 220/1.5 |
| 3,802,357 | 4/1974 | Shahani | 108/55.1 X |
| 3,917,213 | 11/1975 | Poehlmann | 410/111 X |
| 4,049,135 | 9/1977 | Glassmeyer | 410/82 X |
| 4,049,149 | 9/1977 | Durenec | 410/82 |
| 4,131,071 | 12/1978 | Glassmeyer | 108/56.1 X |
| 4,240,359 | 12/1980 | Howe | 108/53.1 |
| 4,319,732 | 3/1982 | Godfrey | 248/346 |
| 4,353,520 | 10/1982 | Jansson | 248/346 |
| 4,355,732 | 10/1982 | Nessfield | 220/1.5 |
| 4,453,878 | 6/1984 | Paukku | 414/498 X |

FOREIGN PATENT DOCUMENTS

| | | |
|---|---|---|
| 0010944 | 5/1980 | European Pat. Off. . |
| 23354 | 1/1956 | Fed. Rep. of Germany ...... 403/348 |
| 2185089 | 12/1973 | France . |
| 2231601 | 12/1974 | France ................. 414/498 |
| 2270766 | 12/1975 | France . |
| 2315442 | 1/1977 | France . |
| 56-01997 | 7/1981 | Japan . |
| 7702392 | 9/1978 | Netherlands .................... 414/498 |
| 1467235 | 3/1977 | United Kingdom . |
| 2028279 | 3/1980 | United Kingdom . |
| 2060567 | 5/1981 | United Kingdom . |

Primary Examiner—Robert B. Reeves
Assistant Examiner—David F. Hubbuch
Attorney, Agent, or Firm—Lucas & Just

[57] ABSTRACT

This invention relates to transport frames for vehicles of the kind which are removable from the vehicle and adapted to have a freight container or other load secured thereto. The frame is provided with four standard corner fittings (14, 15, 16, 17) at the four corners. It is also provided with two twist locks (18,19) adjacent to the forward corner fittings (14,15). Finally, the frame is provided with two removable twist lock assemblies (20,21) which are adapted to be fitted at the rear of the frame adjacent to the corners (16,17).

6 Claims, 3 Drawing Figures

TRANSPORT FRAMES FOR VEHICLES

This invention relates to transport frames for vehicles, the frame being removable from the vehicle, and being adapted to have a freight container or other load secured thereto. A vehicle for use with such a frame is provided with hydraulically operated means for drawing the frame, together with the container or other load, on to, and lowering it from, the vehicle. Various vehicles of the above-mentioned type are already known and, in one particular type, the frame is moved by means of an L-shaped arm constituted by a pivotable beam and slidable jib perpendicular thereto. The frame is also L-shaped consisting basically of two longitudinally extending members joined by transverse members, and having an upstanding extension at the forward end.

Freight containers of standard dimensions are known, and are used in international transport whether by land, sea or air. These containers are provided with corner fittings which may be used both to lift the container, and also to lock it to a vehicle on which it is being transported. The dimensions of these containers are laid down by the International Organisation for Standardisation, and they are accordingly referred to as ISO containers. The dimensions of the corner fittings are laid down, for example, in British Standard Specification No BS4228:1967, and corner fittings complying with this British Standard Specification will be referred to hereinafter as standard corner fittings.

Basically a standard corner fitting includes three mutually perpendicular faces, each having a generally elliptical opening therein. It is to be understood that the fittings on the top four corners of the container, which are hereinafter referred to as upper fittings, will each have openings in faces corresponding respectively to the top of the container, one end of the container, and one side of the container, while the fittings on the bottom of the container, which are hereinafter referred to as lower fittings, will each have openings in faces corresponding respectively to the bottom of the container, one end of the container, and one side of the container.

Standard corner fittings are adapted to be used with a number of different lifting devices, such as hooks, and also with so-called twist-locks. These locks include a generally elliptical member having slightly smaller dimensions than the elliptical openings in the standard corner fittings so that, when the major axis of this member is parallel to the major axis of the corresponding opening, it can be passed through the opening. The member can thereafter be rotated through 90° so that it cannot pass back through the opening.

Since the dimensions of the ISO containers are standardised, these containers can be secured to road vehicles, railway wagons, aircraft or ships fitted with twist-locks located in the necessary standard positions. However, it is necessary for the containers to be lowered into position from above so that the twist-locks can be engaged in the lower corner fittings. Normally suitable lifting equipment will be available when containers are to be loaded on to, or off, railway wagons, aircraft or ships but, in many circumstances, it may be necessary to load the containers on to, or off, road vehicles in places where suitable lifting equipment is not available.

Accordingly, it is an object of the invention to provide a transport frame which can be used to enable an ISO container to be loaded on to a vehicle provided with means for drawing the frame on to the vehicle, and which can also be used for securing other loads not provided with standard corner fittings on vehicles which are provided with twist-locks located in the standard positions.

It is a further object of the invention to provide a transport frame for use in a flexible transport system which enables various loads to be carried in ships, aircraft, road vehicles and trains equipped with ISO twist-locks, and also to be carried by road vehicles provided with means for drawing the frame on to the vehicle.

From one aspect the invention consists in a rectangular transport frame comprising a pair of longitudinally extending members joined by transverse members, and having an upstanding extension at one end thereof, said extension including a further transverse member having means for receiving a lifting hook, and said frame being provided with four standard lower corner fittings as hereinbefore defined, and four twist-locks adapted to mate with corresponding standard lower corner fittings on a freight container located on said frame if said corner fittings on said freight container are spaced apart the same distances as the corner fittings on the frame.

It is to be understood that a transport frame in accordance with the invention not only makes it possible to carry an ISO container or other load on a vehicle having the necessary lifting means, but it also enables loads not in ISO containers or equipped with standard corner fittings to be carried on vehicles provided with twist-locks at standard spacings. Examples of loads which may be carried on transport frames in accordance with the invention include vehicles, portable buildings and earth-moving equipment, apart from pallets or packing cases loaded with smaller items.

Preferably the corner fittings of a transport frame in accordance with the invention are designed so that they can be used not only as standard lower corner fittings, but also as standard upper corner fittings. In other words, each corner fitting is preferably provided with an elliptical opening both in its upper surface and its lower surface. This enables a transport frame in accordance with the invention to be lifted by lifting equipment designed for lifting ISO containers, and also enables it to be slung under a helicopter for transport purposes. This makes it possible to use a helicopter to transport any form of load which can be secured to the transport frame or to sling it from the corner locks in transferring it for example from road to rail vehicles.

From another aspect the invention consists in a rectangular transport frame comprising a pair of longitudinally extending members joined by transverse members and having an upstanding extension at the forward end thereof, said frame being provided with four corner fittings each of which constitutes both a standard lower corner fitting and a standard upper corner fitting as hereinbefore defined.

From yet another aspect the invention consists in a rectangular transport frame provided with four corner fittings, each having a first generally elliptical opening in the face corresponding to the top surface of the frame, a second generally elliptical opening in the face corresponding to the underneath surface of the frame, and a third generally elliptical opening in the face corresponding to one side of the frame.

In this connection, it is also preferred that a transport frame in accordance with the invention be provided with anchor points for vehicles and other heavy loads. These anchor points preferably are located in the vicinity of the front and rear ends of the frame, and are arranged so that they can be recessed below the deck level. They may consist, for example, of a bar 112 mounted in an opening in the deck and a ring 114 surrounding this bar 112 so that it will drop below deck level or can be raised above deck level for attachment to fastening means. (See FIG. 1)

In certain types of vehicle, and in particular in ships designed to carry ISO containers, the twist-locks are so located that, when ISO containers are attached to the locks, there is very little spacing between adjacent containers. A transport frame in accordance with the invention is, as has already been stated, provided with an upstanding extension at one end thereof. Accordingly, if twist-locks are provided on the frame in the position necessary to enable them to cooperate with standard corner fittings on an ISO container, the total length of the frame would exceed maximum ISO diamensions and hence would be too great for it to be accommodated in a ship or other vehicle of the kind mentioned above. Accordingly, in a preferred embodiment of the invention, the twist-locks at the end of the frame opposite to the upstanding extension are arranged so that they can either be removed or pivoted into a position in which they are located entirely within the maximum allowed diamensions of an ISO container.

From another aspect the invention consists in any features of novelty, taken singly or in combination, of the embodiment of the invention illustrated in the accompanying diagrammatic drawings, in which.

Figure 1:
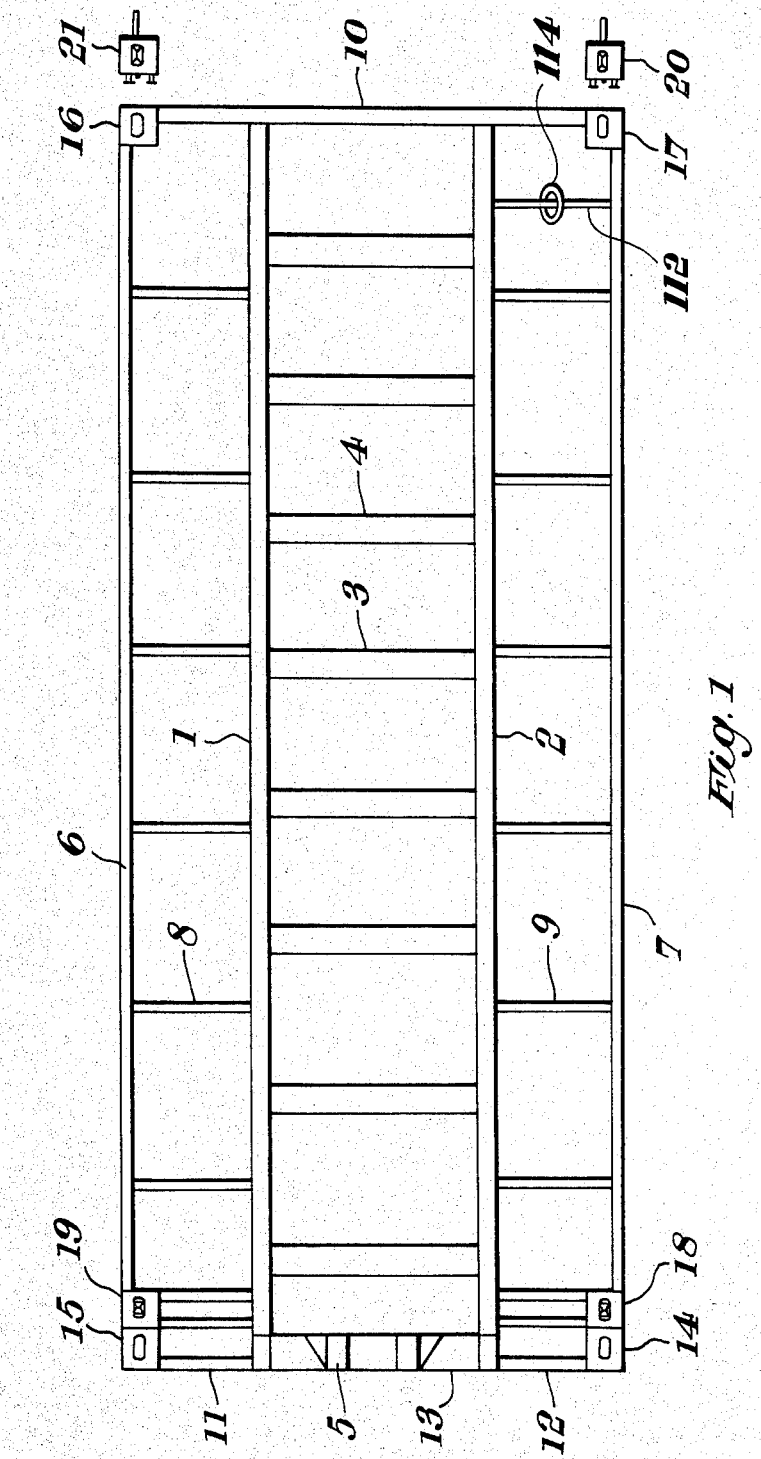
FIG. 1 is a plan view of a transport frame in accordance with the invention.

The transport frame illustrated includes two main longitudinally extending members 1 and 2 interconnected by main transverse members such as those shown at 3 and 4. At the front end of the frame is a generally A-shaped upstanding member 5 which is adapted to cooperate with the lifting hook (not shown) on a vehicle. The two main longitudinal members 1 and 2 are adapted to support the frame on or off the vehicle and, during loading or unloading, cooperate with rollers (not shown) provided at the rear of the vehicle.

The transport frame also includes outer longitudinal members 6 and 7 connected respectively to the main longitudinal members 1 and 2 by transverse members such as those shown at 8 and 9. The frame also includes a rear transverse member 10 and a front transverse assembly including members 11, 12 and 13.

Figure 2:
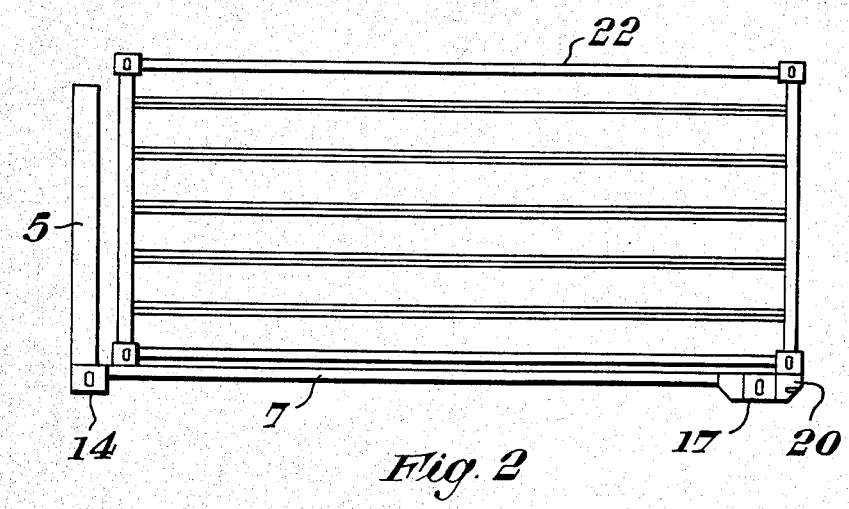
FIG. 2 is a side view of the frame illustrated in FIG. 1 with an ISO container in position.

At the four corners of the frame are four standard corner fittings 14, 15, 16 and 17. In addition, adjacent to the two corner fittings 14 and 15 are two twist-locks 18 and 19. As can be seen from FIG. 2, the corner fittings 14 to 17 extend downwardly below the side members 6 and 7, but they do not extend below the main longitudinal members 1 and 2. The twist-locks 18 and 19 extend above the side members 6 and 7 so that they can engage in the front lower corner fitting of the freight container 22. Two further twist-lock assemblies are shown at 20 and 21 detached from the rear of the frame (in FIG. 1).

Figure 3:
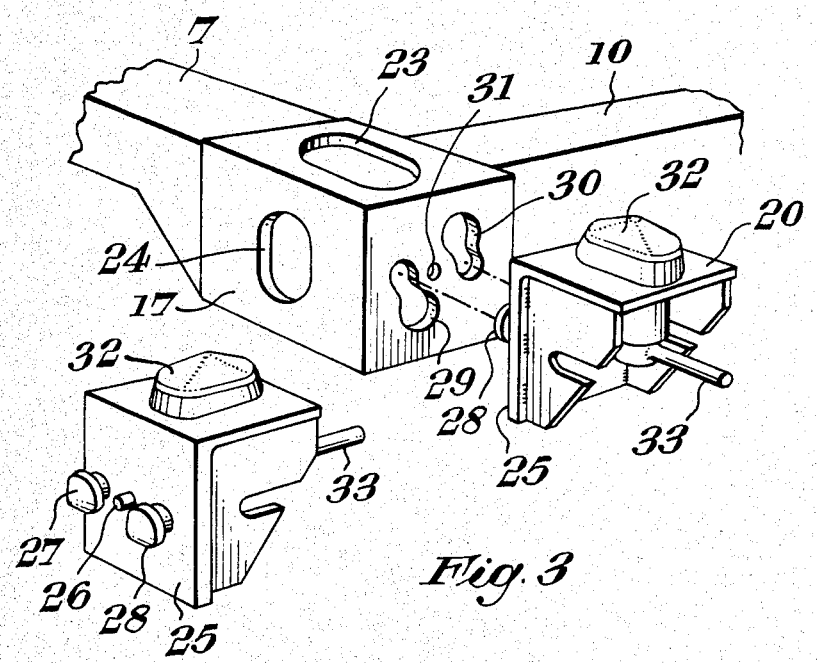
FIG. 3 is a scrap view on an enlarged scale showing one of the lower corner fittings of the frame with a twist-lock assembly removed and shown from two different view-points for clarity.

The corner fitting 17 and the removable twist-lock assembly 20 are shown in more detail in FIG. 3. In the particular view shown, elliptical openings 23 and 24 can be seen in the top and one side respectively of the corner fitting 17. It is, however, to be understood that this corner fitting also includes a further elliptical opening in the base. Similar considerations apply to all the four corner fittings 14 to 17, and the upper elliptical openings 23 may be used to enable the frame to be lifted, for example, by means of a crane; the side elliptical openings 24 may be used to enable the frame to be locked in position on a ship or other vehicle from the side; while the lower elliptical openings (not visible in FIG. 3) may be used to lock the frame in position by means of twist-locks projecting upwardly from the loadbearing surface of the vessel or other vehicle.

As can be seen from FIG. 3, the twist-lock assembly 20 includes an angle member 25, attached to the front surface of which are a locating pin 26 and two locking members 27 and 28. Each of the locking members includes an inner cylindrical portion of a first diameter, and an outer cylindrical flange having a diameter greater than said first diameter. The corner fitting 17 is provided with two key-hole shaped openings 29 and 30. The diameters of these openings are such that the flanges on the locking members 27 and 28 can pass through the larger holes of the openings, but cannot pass through the smaller portions. The rear of the corner fitting 17 is also provided with a hole 31 to receive the locating pin 26. Thus it will be seen that, if the assembly is rotated slightly anticlockwise from the position shown in FIG. 3, and the locating pin 26 is inserted in the hole 31, the flanges on the locking members 27 and 28 can pass through the larger portions of the holes 29 and 30. If the assembly is now rotated so that the upper part of the angle member 25 is parallel to the upper surface of the corner fitting 17, the flanges on the locking members 27 and 28 will engage behind the smaller diameter parts of the holes 29 and 30 so that the assembly cannot thereafter be withdrawn.

As is known, the twist-lock includes an upper generally elliptical portion 32 which can be rotated through 90° by means of a handle 33. Thus it will be seen that, if a container is loaded on to the frame with the assemblies 20 and 21 in position, the two rear lower corner fittings of the container can be locked to the frame by rotating the upper portions 32 of the assemblies 20 and 21. It is of course to be understood that, when the assemblies 20 and 21 are in position, the distance between the centres of the upper portions 32 and the centres of the corresponding upper portions of the twist-locks 18 and 19 correspond to the standard distances between the centres of the lower corner fittings of an ISO container. It will also be understood that, once a container has been locked to the four twist-locks on the frame, the assemblies 20 and 21 cannot be removed because they cannot be rotated anticlockwise to enable the flanges on the locking members 27 and 28 to be withdrawn through the large portions of the holes 29 and 30.

I claim:

1. A rectangular transport frame comprising:
   a pair of longitudinally extending members;
   transverse members joining said pair of longitudinally extending members;
   an upstanding extension at a first end of said frame, said upstanding extension being operative to receive a lifting hook for drawing said frame onto a vehicle;
   a corner fitting provided to said frame at each corner of said frame, each corner fitting being a substantially retangular block with a top wall, a bottom wall and four side walls, said top wall having a generally elliptical opening therein, said bottom wall having a generally elliptical opening therein, and one side wall having a generally elliptical opening therein and a twist-lock at each corner of said frame, having a first means to mate with a corresponding corner fitting on a freight container located on said frame, each said twist-lock at the end of the frame opposite to said first end being releasably secured.

2. A rectangular transport frame comprising:

a pair of longitudinally extending members;

transverse members joining said pair of longitudinally extending members;

an upstanding extension at a first end of said frame, said upstanding extension being operative to receive a lifting hook for drawing said frame onto a vehicle;

a corner fitting provided to said frame at each corner of said frame, each corner fitting being a substantially rectangular block with a top wall, a bottom wall and four side walls, said top wall having a generally elliptical opening therein, said bottom wall having a generally elliptical opening therein, and one side wall having a generally elliptical opening therein and a twist-lock at each corner of said frame, having a first means to mate with a corresponding corner fitting on a freight container located on said frame, each said twist-lock at the end of the frame opposite to the upstanding extension being provided with a second means which allows said twist-locks to be pivoted into a position in which said twist-locks at the end of the frame opposite to the upstanding extension and said twist-locks at the end of the frame adjacent to the upstanding extension are located within the dimensions of an International Organization for Standardization container.

3. A rectangular transport frame comprising:

a plurality of longitudinally extending members;

a plurality of transverse members connected to said plurality of longitudinally extending members;

an upstanding extension at a first end of said frame said upstanding extension being operative to receive a lifting hook for drawing said frame onto a vehicle corner fittings at the corners of the frame, said corner fittings having means to mate with a twist-lock;

twist-locks adjacent to the corner fittings at said first end of the frame; and releasable twist-lock assemblies having a second means for releasing said twist-lock assemblies from said corner fittings at the end of said frame opposite to said first end.

4. A transport frame according to claim 3, wherein said releasable twist-lock assemblies have an angle member and said second means is a locating pin attached to the front surface of said angle member and two locking members attached to the front surface of said angle member said locking members having an inner cylindrical portion of a first diameter, and an outer cylindrical flange having a diameter greater than said first diameter.

5. A transport frame according to claim 4, wherein each of said corner fittings at said end of said frame opposite to said first end have two keyhole openings to receive said locking members of said releasable twist-lock assemblies and with a hole to receive said locating pin on said releasable twist-lock assemblies.

6. A rectangular transport frame comprising:

(a) a pair of longitudinally extending members;

(b) transverse members joining said pair of longitudinally extending members;

(c) an upstanding extension at a first end of said frame, said upstanding member being operative to receive a lifting hook for drawing said frame onto a vehicle;

(d) corner fittings provided to said frame at each corner of said frame, each said corner fitting being a substantially rectangular block with a top wall, a bottom wall and four side walls, said top wall having a generally elliptical opening therein, said bottom wall having a generally elliptical opening therein, and at least one side wall having a generally elliptical opening therein;

(e) anchor points for loads located in the front and the rear of said frame, said anchor points comprising a bar mounted in an opening of the frame and a ring surrounding said bar capable of being moved from a first position in which it is below the deck level of said frame and to a second position in which it is above the deck level of said frame;

(f) twist locks at each corner of said frame, each said twist lock having first means to mate with a corresponding corner fitting on a freight container located on said frame, said twist locks at the end opposite said first end having an angle member, a locating pin attached to the front surface of said angle member and two locking members attached to the front surface of said angle member, said locking members having an inner cylindrical portion of a first diameter, and an outer cylindrical flange having a diameter greater than said first diameter.

* * * * *